F. P. DEDERING.
TRACTOR HITCH.
APPLICATION FILED JULY 21, 1920.
1,407,843.
Patented Feb. 28, 1922.
2 SHEETS—SHEET 1.
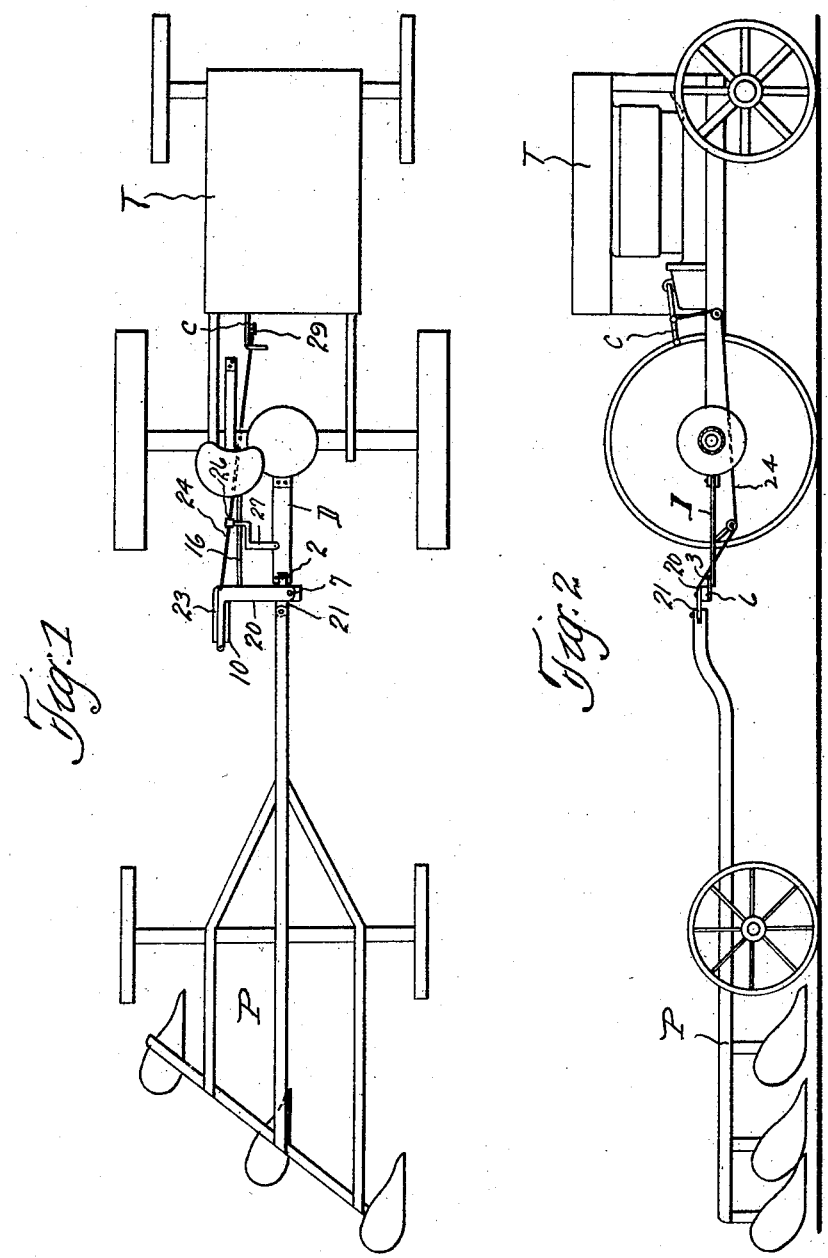
Inventor
Fred P. Dedering
Attorneys.

F. P. DEDERING.
TRACTOR HITCH.
APPLICATION FILED JULY 21, 1920.
1,407,843.
Patented Feb. 28, 1922.
2 SHEETS—SHEET 2.
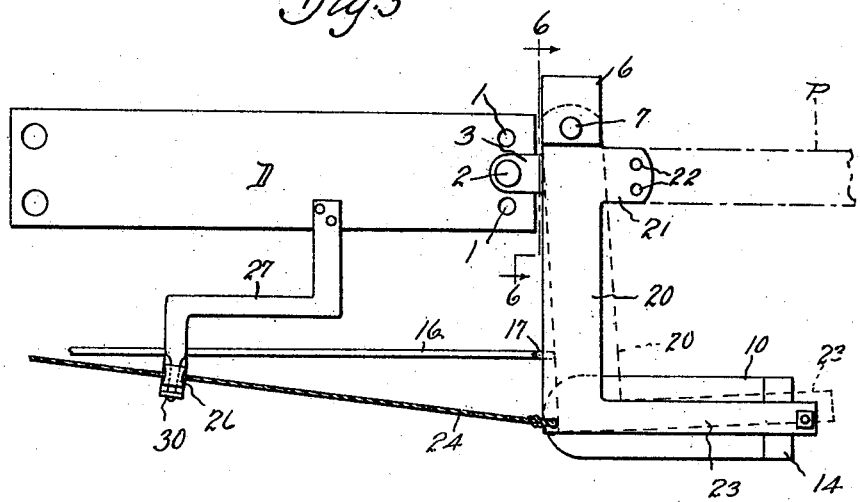
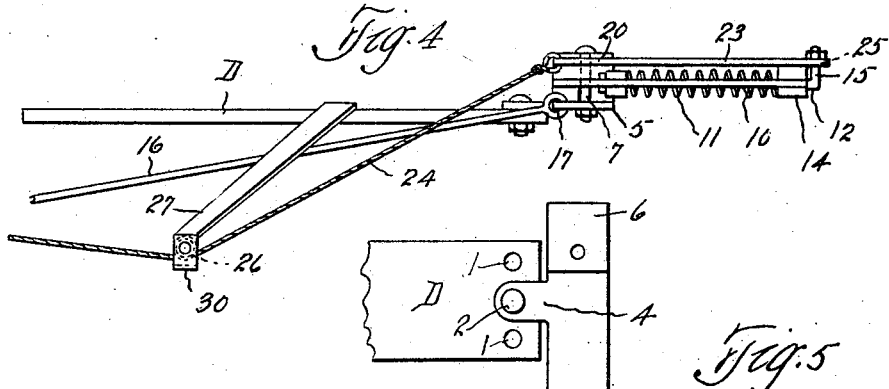
Inventor
Fred P. Dedering
Attorneys

UNITED STATES PATENT OFFICE.

FRED P. DEDERING, OF KIEL, WISCONSIN.

TRACTOR HITCH.

1,407,843.

Specification of Letters Patent. Patented Feb. 28, 1922.

Application filed July 21, 1920. Serial No. 397,967.

*To all whom it may concern:*

Be it known that I, FRED P. DEDERING, a citizen of the United States, residing at Kiel, in the county of Manitowoc, State of Wisconsin, have invented certain new and useful Improvements in Tractor Hitches; and I do hereby declare the following to be a full, clear, and exact description of the invention, such as will enable others skilled in the art to which it appertains to make and use the same.

This invention relates to tractors, and more especially it is a hitch by which an agricultural implement such as a plow may be attached thereto; and the object of the same is to provide the hitch with a movable part connected with the tractor clutch so that when the plow strikes an obstruction said clutch is opened automatically and the tractor stops before an accident occurs.

A further object is to provide means whereby the chain leading from the hitch to the clutch may be removed from the latter, so as to permit the driver to reverse the tractor and close the clutch, and back up a little in case it is necessary to do so to free the plow from the obstruction.

Details of one successful manner of carrying out this idea are set forth below and shown in the drawings wherein:

Figure 1 is a plan view of this hitch, showing the running gear of the tractor in outline only and the plow or similar implement in diagram, and Figure 2 is a side view of the same.

Figure 3 is an enlarged plan of this hitch, showing the upper lever in dotted lines in the position to which it moves under strain.

Figure 4 is a side view of the parts shown in Figure 3.

Figure 5 is a detail with the upper lever omitted.

Figure 6 is a fragmentary detail on the line 6—6 of Figure 3.

Figure 7 is a perspective detail of the clutch lever and the attachment of the chain thereto.

The invention consists essentially in a compensating or draft cushioning hitch for arrangement between the draft bar of a tractor and the draft beam of a following agricultural machine or implement which, for convenience, may be referred to hereinafter as the trailer, and in providing the hitch with complemental pivotally connected members extending transversely of the line of draft or path of movement of the tractor and trailer and respectively connected substantially in the line of draft with the tractor and the trailer and with the pivotal point of connection between said members arranged close to the line of draft; and furthermore, in providing the spring cushioning connection between the free ends of the arms constituting said members and connecting one of said arms to the one which is connected with the trailer, with a clutch or other means on the tractor whereby any considerable movement of said member in opposition to the resistance offered by the cushioning device will throw the tractor out of gear or otherwise actuate means which will result in the immediate stoppage of the tractor, to the end that injury to the trailer or any features thereof which may have caused a resistance to the forward movement of the trailer may be prevented. While these principles of operation may be secured in a variety of ways, it will be sufficient to specifically illustrate as above and hereinafter described, a typical embodiment thereof by reference to said illustration as follows—

The tractor herein is broadly designated by the letter T, and the lever or pedal of its clutch by the letter C, D being the draw bar leading to the rear from the running gear of the tractor. The agricultural implement (herein a plow) to be drawn by this hitch is indicated by the letter P.

At the rear end of the draw bar are several holes 1, into any of which may be inserted a bolt 2 connecting a clevis 3 therewith, and the clevis is connected at 4 with the lower lever or element 5 of the hitch, the same having its inner end bent over at 6 to receive a pivot bolt 7 disposed slightly out of line with the clevis connection between this lever and the draw bar.

The left end of said lever 5 carries a casing 10 projecting to the rear and containing a coil spring 11 enclosing a rod 12 whose front end carries a nut 13 which is adjustable to vary the tension of the spring, the rear end of the latter bearing against a block 14 on the casing and through which the rod slides; and the rear end of said rod is hooked upward as at 15. A link 16 is connected at the point 17 with the lever 5 and leads forward and is attached to some point on the running gear of the tractor, and the length of this link is such that it may swing when the clevis is adjusted in the holes 1.

The numeral 20 designates the upper hitch lever pivotally mounted at its inner end on the bolt 7 near which it has a draw plate 21 with holes 22 in any of which the plow or implement P can be hitched. The lever extends out over the lower lever, and from its outer end a finger 23 projects to the rear, the finger having a hole or eye 25 to slip over the hooked rear end 15 of the rod through the spring. From the angle between the lever and its finger a flexible element such as a chain 24 leads forward, under a roller 26 carried by an arm 27 projecting from the draw bar, and thence upward to a loop or ring 28, the same being slipped over a projection or pin 29 on the clutch lever or pedal C.

Assuming that a plow is connected with a tractor by this hitch, it will be obvious that when the plow point strikes an obstruction and the forward movement of the plow ceases, the lever 20 will pivot on the bolt 7, its finger 23 will move to the rear as the compression of the spring 11 permits, and the chain 24 will be drawn on. This throws the clutch lever C and opens the clutch, so that forward progress of the tractor ceases immediately and before anything can be broken. In case it becomes necessary to back the tractor in order to release the plow from the obstruction, and yet its clutch cannot be closed by reason of tension on the chain, it is only necessary to slip the loop or ring 28 off the pin 29 on the clutch lever, as will be clear.

I prefer to attach the forward end of the link to some part near the front portion of the tractor running gear, as for instance the front axle brace shaft. Also I prefer to give the arm 27 the shape best seen in Figure 1, and to provide a guard 30 beneath the roller 26 to prevent the chain from slipping off the same.

What is claimed is:

1. A hitch for communicating progressive movement from a tractor to a trailer, consisting of relatively movable pivotally connected members extended transversely of the line of draft, said members having means for connection respectively with a tractor draft bar and a trailer draft beam, substantially on the line of draft and slightly offset laterally from the pivotal connection of said members, a spring cushioning means connecting the free ends of said members at the opposite side of the line of draft from the pivotal connection of the members to yieldingly resist swinging movement of the member connected with the trailer, and the connection between the last-named member and the clutch mechanism of the tractor.

2. A hitch for communicating progressive movement from a tractor to a trailer, consisting of relatively movable pivotally connected members extended transversely of the line of draft, said members having means for connection respectively with a tractor draft bar and a trailer draft beam, substantially on the line of draft and slightly offset laterally from the pivotal connection of said members, a spring cushioning means connecting the free ends of said members at the opposite side of the line of draft from the pivotal connection of the members to yieldingly resist swinging movement of the member connected with the trailer, and the connection between the last-named member and the clutch mechanism of the tractor, said free ends of the members having rearwardly directed arms of which that connected with the trailer carries a parallel rod slidingly mounted in guides on the other arm and provided with a follower, with a spring coiled upon the rod between said follower and a fixed bearing on the last-named arm.

3. A hitch for communicating progressive movement from a tractor to a trailer, consisting of relatively movable pivotally connected members extended transversely of the line of draft, said members having means for connection respectively with a tractor draft bar and a trailer draft beam, substantially on the line of draft and slightly offset laterally from the pivotal connection of said members a spring cushioning means connecting the free ends of said members at the opposite side of the line of draft from the pivotal connection of the members to yieldingly resist swinging movement of the member connected with the trailer, and the connection between the last-named member and the clutch mechanism of a tractor, the means of connection between the arms and the said tractor and trailer being variable in lateral position with relation to the pivotal point of connection of the members to vary the leverage of the resistance applied by the trailer to the member with which it is connected.

In testimony whereof, I affix my signature, in the presence of two witnesses.

FRED P. DEDERING.

Witnesses:
ALBERT WAGENKNECHT,
MELVIN C. SIMM.